(12) United States Patent
Kim

(10) Patent No.: US 11,662,696 B2
(45) Date of Patent: May 30, 2023

(54) AUTOMATIC CONTROL ARTIFICIAL INTELLIGENCE DEVICE AND METHOD FOR UPDATE CONTROL FUNCTION

(71) Applicant: LG ELECTRONICS INC., Seoul (KR)

(72) Inventor: Bongsang Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1007 days.

(21) Appl. No.: 16/454,816

(22) Filed: Jun. 27, 2019

(65) Prior Publication Data
US 2020/0004210 A1 Jan. 2, 2020

Related U.S. Application Data

(60) Provisional application No. 62/692,876, filed on Jul. 2, 2018, provisional application No. 62/690,360, filed on Jun. 27, 2018.

(30) Foreign Application Priority Data
Oct. 26, 2018 (KR) .................. 10-2018-0129219

(51) Int. Cl.
*G05B 13/02* (2006.01)
(52) U.S. Cl.
CPC .................. *G05B 13/027* (2013.01)
(58) Field of Classification Search
CPC ........ G05B 13/027; G05B 2219/33056; G06N 3/0445; G06N 3/006; G06N 3/08
See application file for complete search history.

(56) References Cited

U.S. PATENT DOCUMENTS

2003/0074338 A1* 4/2003 Young .................. G05B 13/027
706/15
2008/0195236 A1 8/2008 Koo et al.
(Continued)

FOREIGN PATENT DOCUMENTS

JP H06102902 4/1994
JP 2004193219 7/2004
(Continued)

OTHER PUBLICATIONS

Shiromaru Isao, Deviation Amount Compensation Program, Deviation Amount Compensation Device, and PID Control Output Compensation Device (Translation), Jun. 7, 2007, Espacenet Machine Translation (Year: 2007).*
(Continued)

*Primary Examiner* — Rocio Del Mar Perez-Velez
*Assistant Examiner* — Christopher W Carter
(74) *Attorney, Agent, or Firm* — Lee, Hong, Degerman, Kang & Waimey PC

(57) ABSTRACT

Disclosed herein is an automatic control artificial intelligence device including a collection unit configured to acquire an output value according to control of a control system; and an artificial intelligence unit operably coupled to the collection unit and configured to: communicate with the collection unit; set at least one of one or more base lines and a reward based on a gap between the one or more base lines and the output value, according to a plurality of operation goals of the control system; and update a control function for providing a control value to the control system by performing reinforcement learning based on the gap between the one or more base lines and the output value.

18 Claims, 11 Drawing Sheets

(56) References Cited

U.S. PATENT DOCUMENTS

| | | | |
|---|---|---|---|
| 2012/0046835 A1 | 2/2012 | Matsumoto et al. | |
| 2016/0187897 A1 | 6/2016 | Peng et al. | |
| 2017/0116511 A1 | 4/2017 | Kim et al. | |
| 2017/0270434 A1* | 9/2017 | Takigawa | B23K 26/38 |
| 2018/0100662 A1 | 4/2018 | Farahmand et al. | |

FOREIGN PATENT DOCUMENTS

| | | |
|---|---|---|
| JP | 2008305157 | 12/2008 |
| JP | 2009156502 | 7/2009 |
| JP | 2010086405 | 4/2010 |
| JP | 2011059870 | 3/2011 |
| KR | 100866213 | 10/2008 |
| KR | 101242678 | 3/2013 |

OTHER PUBLICATIONS

United States Patent and Trademark Office U.S. Appl. No. 16/454,859, Office Action dated Jun. 30, 2021, 40 pages.

Korean Intellectual Property Office Application No. 10-2018-0129219, Office Action dated Mar. 25, 2020, 4 pages.

PCT International Application No. PCT/KR2019/007812, Written Opinion of the International Searching Authority dated Oct. 8, 2019, 8 pages.

PCT International Application No. PCT/KR2019/007810, Written Opinion of the International Searching Authority dated Oct. 11, 2019, 8 pages.

* cited by examiner

AUTOMATIC CONTROL ARTIFICIAL INTELLIGENCE DEVICE AND METHOD FOR UPDATE CONTROL FUNCTION

CROSS-REFERENCE TO RELATED APPLICATIONS

Pursuant to 35 U.S.C. § 119, this application claims the benefit of U.S. Provisional Patent Application Nos. 62/690,360, filed on Jun. 27, 2018, and 62/692,876, filed on Jul. 2, 2018, and also claims the benefit of earlier filing date and right of priority to Korean Patent Application No. 10-2018-0129219, filed on Oct. 26, 2018, the contents of which are all hereby incorporated by reference herein in their entirety.

BACKGROUND OF THE INVENTION

1. Field of the Invention

The present invention relates to an automatic control artificial intelligence device for acquiring an output value according to control of a control system, setting a base line or a reward according to a plurality of operation goals of the control system and updating a control function for outputting a control value of the control system by performing reinforcement learning based on a gap between the base line and the output value.

2. Discussion of the Related Art

Artificial intelligence is a field of computer engineering and information technology involving studying how computers can think, learn and self-develop in ways similar to human intelligence such that computers can emulate intelligent actions of humans. Moreover, artificial intelligence does not exist by itself, but is directly or indirectly associated with other fields of computer science. In particular, many attempts have been made to introduce elements of artificial intelligence into various fields of information technology.

Feedback control means control for configuring a closed loop to compare a control amount with a target value by feedback and to perform correction such that the control amount matches the target value. Such feedback control is widely used in home heating controllers using thermostats to large-scale industrial control systems used to control machines or processes. Examples of widely used feedback control methods include proportional-integral-derivative control (hereinafter referred to as PID control).

PID control is a combination of proportional control, integral control and derivative control, which acquires a current value of an object to be controlled, compares the current value with a set point (SP), calculates an error, and calculates a control value necessary for control using the error.

In PID control, the control value is calculated by a PID control function including a proportional term, an integral term, and a derivative term. The proportional term is proportional to the error, the integral term is proportional to the integral of the error, and the derivative term is proportional to the derivative of the error.

The proportional term, the integral term, and the derivative term may include a proportional gain parameter which is the gain of the proportional term, an integral gain parameter which is the gain of the integral term, and the derivative gain parameter which is the gain of the derivative term, respectively.

A PID parameter may include the gains of the respective terms included in the PID function. That is, the PID parameter may include a proportional gain parameter, an integral gain parameter, and a derivative gain parameter. Since the control value output from the control function depends on the PID parameter, it is important to set appropriate PID parameters in order to optimize system performance.

However, conventionally, since PID parameters are directly set by humans based on human experience and intuition, it may be impossible to calculate an optimal parameter. Moreover, even if it is assumed that there is a person who has a lot of experience and excellent intuition and thus can calculate a near-optimal parameter, since an external environment differs according to a place where the control system is installed, the human experience and intuition may be only applicable to a control system installed at a specific place and cannot be commonly used for all control systems.

Since experience and intuition significantly differ from person to person, even if a person who has a lot of experience and excellent intuition and thus can calculate a near-optimal parameter is a manager of a control system, the quality of the set parameter may deteriorate when the manager is replaced. Moreover, as environmental conditions change throughout the year and due to other variables, an optimal PID parameter suitable for current environmental conditions may be changed. However, it may be impossible to appropriately optimize the parameter according to change in environmental conditions with human intuition and experience.

SUMMARY OF THE INVENTION

An object of the present invention devised to solve the problem lies in an automatic control artificial intelligence device for acquiring an output value according to control of a control system, setting a base line or a reward according to a plurality of operation goals of the control system, and updating a control function for outputting a control value of the control system by performing reinforcement learning based on a gap between the base line and the output value.

An automatic control artificial intelligence device according to an embodiment of the present invention includes a collection unit configured to acquire an output value according to control of a control system; and an artificial intelligence unit operably coupled to the collection unit and configured to: communicate with the collection unit; set at least one of one or more base lines and a reward based on a gap between the one or more base lines and the output value, according to a plurality of operation goals of the control system; and update a control function for providing a control value to the control system by performing reinforcement learning based on the gap between the one or more base lines and the output value.

In this case, the one or more base lines may include a first base line, and the artificial intelligence unit may acquire one or more parameters for enabling the output value to closely follow the first base line, by giving a reward based on a gap between the first base line and the output value.

In this case, the artificial intelligence unit may give the reward differently according to a position of the gap between the first base line and the output value.

Meanwhile, the first base line may include a first line indicating a change in the output value according to maximum control of the control system and a second line matching a set value, and the artificial intelligence unit may perform the reinforcement learning in order to follow the first line for a first time until the output value reaches the set value and to follow the second line for a second time after the output value has reached the set value.

In this case, the first time may be proportional to the second time.

Meanwhile, the one or more base lines may further include a second base line, and the artificial intelligence unit may perform the reinforcement learning to acquire the one or more parameters in order for the output value to follow the first base line and to avoid the second base line.

In this case, the artificial intelligence unit may give a reward based on the gap between the first base line and the output value and give a penalty based on a gap between the second base line and the output value.

In this case, a magnitude of the penalty may be greater than a magnitude of the reward.

Meanwhile, the artificial intelligence unit may discard one or more parameters used for the control function when the output value matches one point on the second base line.

The artificial intelligence unit may reset the first base line according to a change in an environment condition.

A method for updating a control function according to another embodiment of the present invention includes acquiring an output value according to control of a control system, setting at least one of one or more base lines and a reward based on a gap between the one or more base lines and the output value, according to a plurality of operation goals of the control system, and updating the control function for providing a control value to the control system by performing reinforcement learning based on the gap between the one or more base lines and the output value.

In this case, the one or more base lines may include a first base line, and the updating of the control function for providing the control value to the control system may include acquiring the one or more parameters for enabling the output value to closely follow the first base line by giving a reward based on a gap between the first base line and the output value.

In this case, the acquiring of the one or more parameters for enabling the output value to closely follow the first base line may include giving the reward differently according to a position of the gap between the first base line and the output value.

Meanwhile, the first base line may include a first line indicating a change in the output value according to maximum control of the control system and a second line matching a set value, and the acquiring of the one or more parameters for enabling the output value to closely follow the first base line may include performing the reinforcement learning in order to follow the first line for a first time until the output value reaches the set value and to follow the second line for a second time after the output value has reached the set value.

In this case, the first time may be proportional to the second time.

Meanwhile, the one or more base lines may further include a second base line, and the updating of the control function for providing the control value to the control system may include performing the reinforcement learning to acquire the one or more parameters in order for the output value to follow the first base line and to avoid the second base line.

In this case, the performing of the reinforcement learning to acquire the one or more parameters in order for the output value to follow the first base line and to avoid the second base line may include giving a reward based on the gap between the first base line and the output value and giving a penalty based on a gap between the second base line and the output value.

In this case, a magnitude of the penalty may be greater than a magnitude of the reward.

Meanwhile, the performing of the reinforcement learning to acquire the one or more parameters in order for the output value to follow the first base line and to avoid the second base line may include discarding one or more parameters used for the control function when the output value matches one point on the second base line.

The method may further include resetting the first base line according to a change in an environment condition.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" or "coupled to" another element, the element can be directly connected with the other element or intervening elements may also be present. In contrast, if an element is referred to as being "directly connected with" or "directly coupled to" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
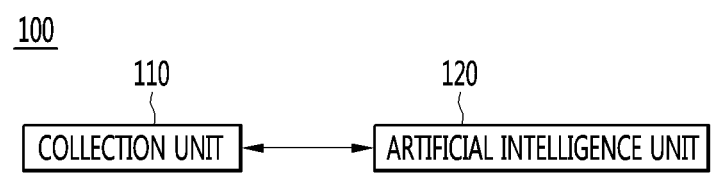
FIG. 1 is a block diagram illustrating an artificial intelligence device according to an embodiment of the present invention.

FIG. 1 is a block diagram illustrating an artificial intelligence device according to an embodiment of the present invention.

In the present invention, the term "automatic control artificial intelligence device" may be used interchangeably with the term "artificial intelligence device."

The artificial intelligence device 100 according to an embodiment of the present invention may provide a control function to a control system.

The control system may mean all systems for collecting a current value, outputting a control value using the collected current value, a set value, and a control function, and performing control according to the output control value, such as an air conditioning system, an energy management system, a motor control system, an inverter control system, a pressure control system, a flow rate control system, a cooling/heating system, etc.

For example, in the air conditioning system, the current value may be a current temperature (that is, an output value according to existing valve control) and the set value may be a target temperature. In addition, an error between the current value and the set value may be input to a control function and the control function may calculate and provide a control value to the air conditioning system. In this case, the air conditioning system may perform control according to the control value to open a valve according to the control value.

As another example, in the energy management system, the current value may be a current charge amount (that is, an output value according to existing charge amount control) and the set value may be a target charge amount. In addition, an error between the current value and the set value may be input to a control function, and the control function may calculate and provide a control value to the energy management system. In this case, the energy management system may perform control according to the control value to control the charge amount according to the control value.

As another example, in the motor control system, the current value may be a current motor speed (that is, an output value according to existing speed control) and the set value may be a target motor speed. In addition, an error between the current value and the set value may be input to a control function, and the control function may calculate and provide a control value to the motor control system. In this case, the motor control system may perform control according to the control value to control the motor speed according to the control value.

Meanwhile, the artificial intelligence device 100 may include a collection unit 110 and an artificial intelligence unit 120.

The collection unit 110 may acquire an output value according to control of a control system. Here, the output value according to control of the control system may mean a state in which an object to be controlled by the control system is controlled by the control system.

For example, the object to be controlled by the air conditioning system may be a temperature and the output value according to control of the control system may mean a temperature obtained or changed by temperature control of the air conditioning system.

As another example, the object to be controlled by the motor control system may be the speed of the motor and the output value according to control of the control system may mean the speed of the motor obtained or changed by speed control of the motor control system.

The output value according to control of the control system may be used as a current value. That is, a feedback control loop may be configured by setting the output value of the control system as the current value and inputting the error between the current value and the set value to the control function again.

The output value may be directly sensed by the artificial intelligence device or received from another system or device.

Specifically, the collection unit 110 may include a sensing unit for sensing the output value according to control of the control system.

For example, when the object to be controlled is a temperature, the collection unit 110 may include a temperature sensor and, when the object to be controlled is pressure, the collection unit 110 may include a pressure sensor.

When the artificial intelligence device 100 and the control system are separately configured, the control system may sense the output value, and the collection unit 110 of the artificial intelligence device 100 may receive the output value from the control system. In this case, the collection unit 110 may include a communication unit for communicating with the control system.

Even when the artificial intelligence device 100 and the control system are separately configured, in addition to the control system sensing the output value, the collection unit 110 may also sense the output value.

Although not shown, the artificial intelligence device 100 may include a storage unit. A control function, a pattern of an output value, an application program for reinforcement learning, an application program for learning time-series data using a recurrent neural network, etc. may be stored in the storage unit.

The control method of the control system will be described.

In one aspect, the control function updated in the present invention may be a control function of feedback control, which includes one or more parameters.

Terms used in the present invention will be described using the PID control function of Equation 1, for example.

$$u(t) = K_p e(t) + K_i \int_0^t e(\tau)d\tau + K_d \frac{de(t)}{dt} \quad \text{[Equation 1]}$$

PID control is a control loop feedback mechanism widely used in an industrial control system.

PID control is a combination of proportional control, integral control, and derivative control, which acquires a current value of an object to be controlled, compares the current value with a set point (SP), calculates an error and calculates a control value (CV) u(t) necessary for control using the error.

For example, in a heating system, the current value is a current temperature, the set point (SP) is a target temperature, and the error e(t) may be a difference between the current temperature and the target temperature.

Meanwhile, in PID control, the control value (CV) u(t) may be calculated by a PID control function including a proportional term $K_p e(t)$, an integral term $K_i \int_0^t e(r)dr$, and a derivative term $$K_d \frac{de(t)}{dt}.$$

In this case, the proportional term $K_p e(t)$ is proportional to the error e(t), the integral term $K_i \int_0^t e(r)dr$ is proportional to the integral of the error e(t), and the derivative term $$K_d \frac{de(t)}{dt}$$

is proportional to the derivative of the error e(t).

Further, the proportional term, the integral term, and the derivative term may include a proportional gain parameter $K_p$ which is gain of the proportional term, an integral gain parameter $K_i$ which is gain of the integral term, and a derivative gain parameter $K_d$ which is gain of the derivative term, respectively.

The PID parameters of the gains of the terms are included in the PID function. That is, the PID parameter may include the proportional gain parameter $K_p$, the integral gain parameter $K_i$, and the derivative gain parameter $K_d$.

Output of the PID controller is the control value (CV) u(t), and the control value (CV) u(t) may be used as input of the control system. In other words, the control value (CV) u(t) may mean a manipulated variable (MV).

In addition, the control system may perform control corresponding to the control value (CV) u(t).

For example, in a heating system, when the control value (CV) u(t) of 80% is output by the control function, the heating system may perform control corresponding to the control value (CV) u(t) of 80%, that is, control for opening a valve by 80%.

Meanwhile, the output value according to control of the control system may mean a state in which an object to be controlled by the control system is controlled by the control system. That is, the output value may mean a process variable (PV).

For example, in the heating system, the object to be controlled is a temperature and the output value may mean a temperature maintained or changed by control of the heating system.

Meanwhile, the control system senses the output value and uses the output value as the current value. In this manner, a control loop is formed and control is performed by a feedback mechanism.

Meanwhile, the artificial intelligence unit 120 may update a control function for providing a control value to the control system based on reinforcement learning.

Reinforcement Learning is the theory that an agent can find a best way with experience thereof without data if an environment in which the agent can determine what action to take every moment is given.

Reinforcement Learning may be performed by a Markov Decision Process (MDP).

The Markov Decision Process (MDP) will be described. First, an environment including information necessary for the agent to take a next action is given. Second, what action is taken by the agent in that environment is defined. Third, a reward given to the agent when the agent successfully takes a certain action and a penalty given to the agent when the agent fails to take a certain action are defined. Fourth, experience is repeated until a future reward reaches a maximum point, thereby deriving an optimal action policy.

The Markov Decision Process (MDP) is applicable to the artificial intelligence unit 120 according to the embodiment of the present invention.

Specifically, first, an environment in which the output value or the pattern of the output value is provided is given to the artificial intelligence unit 120, such that the artificial intelligence unit 120 updates the control function. Second, action of the artificial intelligence unit 120 is defined such that the output value follows the base line in order to achieve a goal. Third, a reward is given as the artificial intelligence unit follows the base line. Fourth, the artificial intelligence unit 120 repeats learning until the sum of reward is maximized, thereby deriving an optimal control function.

In this case, the artificial intelligence unit 120 may update the feedback control function based on the output value according to the control function.

Specifically, when the control system performs control corresponding to the control value received from the control function, the artificial intelligence unit 120 may update one or more parameters of the feedback control function such that a goal is achieved through the output value according to control of the control system.

The artificial intelligence unit 120 takes an action of changing the parameter of the control function, acquires the state (output value) and the reward according to the action, and acquires a policy for maximizing the reward.

In this case, the goal achieved by the artificial intelligence unit 120 may be set by a point at which the reward is given, the magnitude of the reward, etc.

The artificial intelligence unit 120 may variously change the parameter of the control function using a try-and-error method. When the output value is acquired according to the control function having the changed parameter, the reward may be given to the acquired output value, thereby acquiring a policy for maximizing the reward.

Meanwhile, a best policy achieved by the artificial intelligence unit 120 is preset by reinforcement learning, and when the artificial intelligence unit 120 takes an action to follow the beast policy, the amount of learning of the artificial intelligence unit 120 can be significantly reduced.

Accordingly, in the present invention, it is possible to preset the best policy achieved by the artificial intelligence unit 120 by reinforcement learning.

In this case, the best policy achieved by the artificial intelligence unit 120 may mean ideal change of the output value according to control of the control system.

Here, the ideal change of the output value according to control of the control system may be referred to as a base line.

The artificial intelligence unit 120 may update the control function for providing the control value to the control system, such that the output value according to control of the control system follows the base line.

This will be described in detail with reference to FIG. 2.

Figure 2:
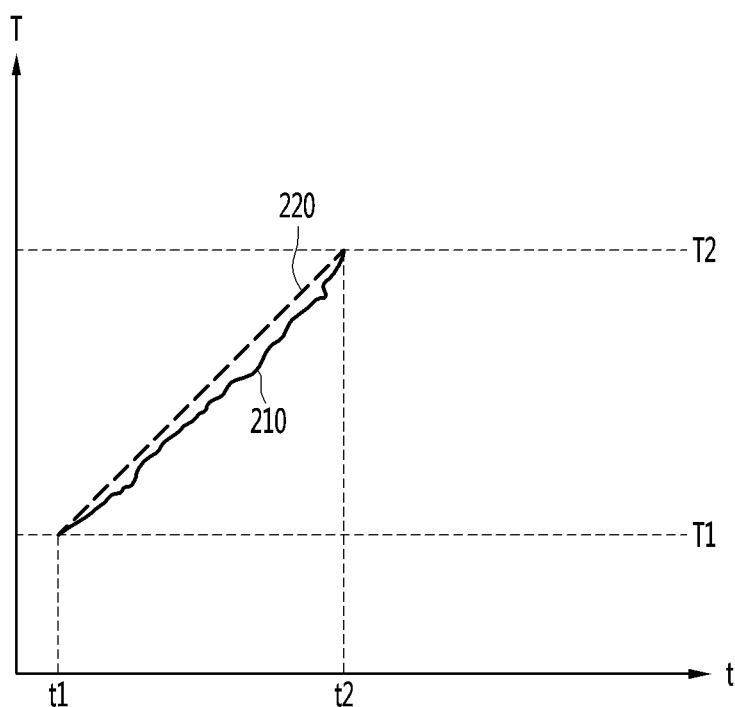
FIG. 2 is a diagram illustrating a method of setting a base line according to an embodiment of the present invention.

FIG. 2 is a diagram illustrating a method of setting a base line according to an embodiment of the present invention.

The base line may include a first line indicating change in an output value according to maximum control of the control system.

Specifically, the first line may indicate change in the output value obtained when the control system performs maximum control according to the maximum control value of the control function.

For example, in the heating system, when a maximum control value of 100% is output by the control function, the heating system may perform control corresponding to the control value of 100%, that is, control of opening the valve by 100%.

In this case, the first line may mean change in a temperature, which is the object to be controlled, when the valve is opened by 100%.

Meanwhile, change 210 in the output value according to maximum control of the control system may be the first line.

The present invention is not limited thereto and the average rate 220 of change of the output value according to maximum control of the control system may be the first line.

For example, when the heating system starts operation at a first temperature T1 at a first point of time t1 and performs maximum control to reach a second temperature T2 at a second point of time t2, the first line may indicate the average rate of change of the temperature from the first point of time t1 to the second point of time t2.

Meanwhile, the artificial intelligence unit 120 may set the first line in an environment in which the control system is installed.

Specifically, the artificial intelligence unit 120 may control the control system such that the control system performs maximum control in the environment in which the control system is installed.

For example, if the control system is a valve system for supplying water for heating to a pipe of a specific room of a building, the artificial intelligence device 120 may control the valve system for supplying water for heating to the pipe of the specific room to maximally open the valve.

If the artificial intelligence device 100 and the control system are separately configured, the artificial intelligence unit 120 may transmit a control command for instructing the control system to perform maximum control to the control system.

In contrast, if the artificial intelligence device 100 and the control system are integrally configured, the artificial intelligence unit 120 may directly control an operation unit to perform maximum control.

Meanwhile, while the control system performs maximum control, the artificial intelligence unit 120 may acquire the output value according to maximum control of the control system. In addition, the artificial intelligence unit 120 may set the first line based on the acquired output value.

Figure 3:
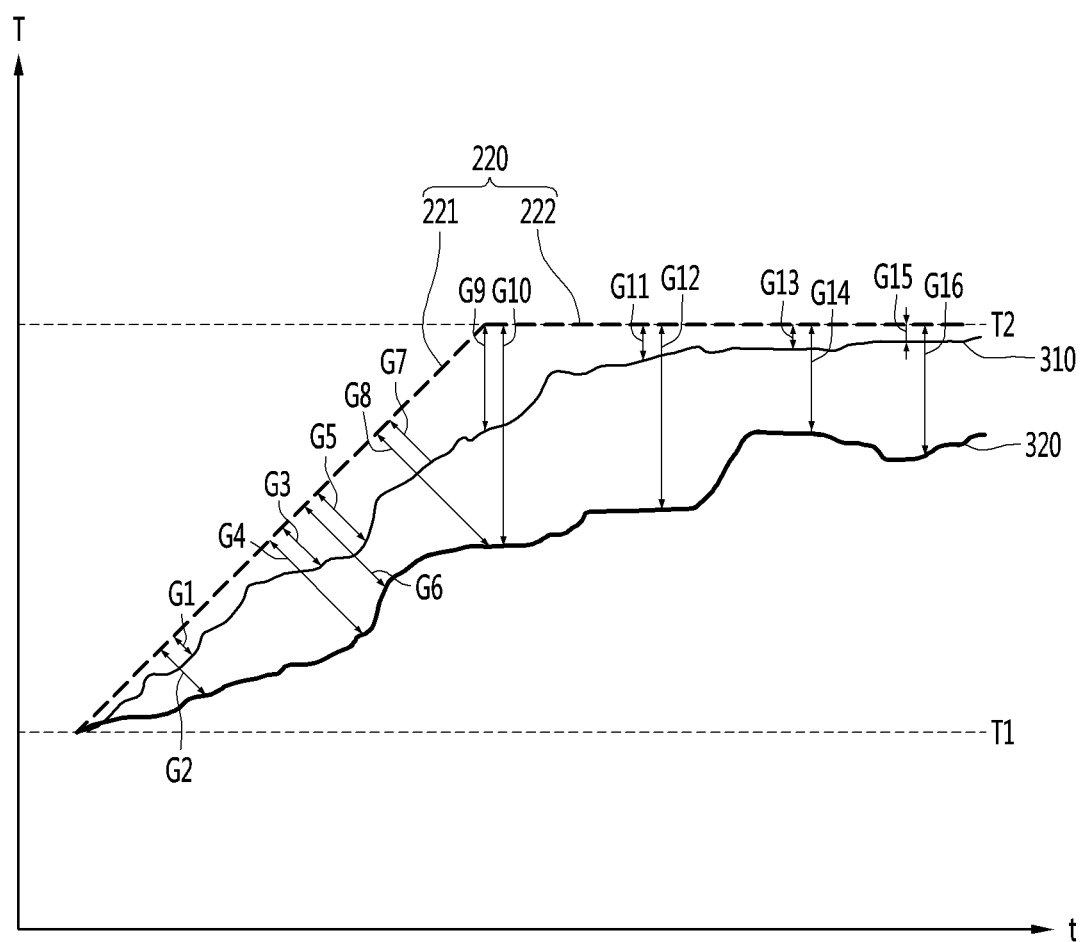
FIG. 3 is a diagram illustrating a method of performing reinforcement learning such that a second line and an artificial intelligence unit follow a base line according to an embodiment of the present invention.

FIG. 3 is a diagram illustrating a method of performing reinforcement learning such that a second line and an artificial intelligence unit follow a base line according to an embodiment of the present invention.

The first line 221 of the base line 220 means change in an output value according to maximum control of the control system as described with reference to FIG. 2.

Here, setting the first line 221 may serve to provide artificial intelligence unit 120 with a goal of rapidly reaching a set value.

The base line 220 may further include a second line 222.

Setting the second line 222 may serve to provide the artificial intelligence unit 120 with a goal of reducing overshoot of the output value or fluctuation of the output value above or below the set value after reaching the set value.

Accordingly, the second line 222 may match the set value. Here, the set value may be a target value of the output value when specific operation is performed.

For example, when the current temperature is 24° C. and a command for increasing the temperature to 30° C. is received, the control system may perform an operation for increasing the temperature to 30° C. In this case, the artificial intelligence unit 120 may set the base line including the first line indicating the average rate of change of the temperature when the control system performs maximum control and the second line for increasing the temperature to 30° C.

As another example, when the current temperature is 24° C. and a command for increasing the temperature to 27° C. is received, the control system may perform an operation for increasing the temperature to 27° C. In this case, the artificial intelligence unit 120 may set the base line including the first line indicating the average rate of change of the temperature when the control system performs maximum control and the second line for increasing the temperature to 27° C.

Meanwhile, the artificial intelligence unit 120 may perform reinforcement learning such that the output value according to control of the control system follows the base line 220.

Here, following the base line may mean that the output value according to control of the control system most closely approaches the base line 220.

In addition, the artificial intelligence unit 120 may perform reinforcement learning such that the output value according to control of the control system follows the base line 220, thereby acquiring one or more parameters of the control function.

Specifically, the artificial intelligence unit 120 may acquire output values 310 and 320 while variously changing the parameters of the control function in a try and error manner.

In addition, the artificial intelligence unit 120 gives a reward based on a gap between the base line 220 and the output value, thereby acquiring one or more parameters for enabling the output value according to control of the control system to most closely follow the base line 220.

Specifically, the artificial intelligence unit 120 may calculate a gap between the base line 220 and the output at one or more points or all points.

As the gap between the base line 220 and the output value is decreased, the given reward may be increased. The artificial intelligence unit 120 may acquire one or more parameters for maximizing the reward.

For example, assume that the output value obtained when the control system performs control according to the control value of the control function including a first parameter is a first output 310 and the output value obtained when the control system performs control according to the control value of the control function including a second parameter is a second output 320.

Gaps G1, G3, G5, G7, G9, G11, G13 and G15 between the first output value 310 and the base line 220 are smaller than gaps G2, G4, G6, G8, G10, G12, G14 and G16 between the second output value 320 and the base line 220.

That is, the reward given when the first parameter is used is greater than the reward given when the second parameter is used. In this case, the artificial intelligence unit 120 may acquire the first parameter as the parameter for enabling the output value to most closely follow the base line.

In this manner, the artificial intelligence unit 120 may continuously perform reinforcement learning, thereby acquiring the parameter for enabling the output value according to control of the control system to most closely follow the base line.

When a new parameter for enabling the output value according to control of the control system to most closely follow the base line is acquired, the artificial intelligence unit 120 may change the parameter of the existing control function to the newly acquired parameter, thereby updating the existing control function.

Meanwhile, the gaps G1, G3, G5, G7, G9, G11, G13 and G15 shown in FIG. 3 indicate the distances between the output value and the base line at several points and are merely exemplary.

For example, the gap between the output value and the base line may mean the area of a space between the output value and the base line.

That is, the area of the space between the first output value 310 and the base line 220 when the first parameter is used may be smaller than that of the space between the second output value 320 and the base line 220 when the second parameter is used. In this case, a reward given when the first parameter is greater than a reward given when the second parameter is used. The artificial intelligence unit 120 may acquire the first parameter as the parameter for enabling the output value to most closely follow the base line.

That is, the gap described in this specification may mean a difference between the base line and the output value.

The output value according to control of the control system is determined not only by control of the control system, but also determined by various variables.

For example, in the heating system, the output value according to control of the control system is determined by various variables such as season, weather, time, date, an area of a space, whether a window is opened, a number of persons in a space, whether a door is opened, whether an insulator is used, etc.

Since it is impossible for humans to analyze various variables to calculate an optimal parameter, a PID parameter has been directly set by humans based on human experience and intuition. As a similar example, in the game of "Go", also known as "ba-duk", where there are a large number of cases, Go players find moves based on experience and intuition thereof.

However, the present invention is advantageous in that a learning environment is provided to an artificial intelligence agent and the artificial intelligence agent learns a large amount of data, thereby calculating an optimal parameter regardless of various variables for determining the output value. As a similar example, in Go where there are a large number of cases, an artificial intelligence agent learns the record of Go to find optimal moves.

In an operating environment of the control system, in which there are various variables and a set value may be changed whenever an operation is performed, how to set the goal of the artificial intelligence agent may come into question.

However, the present invention is advantageous in that a clear goal of following the base line is given to the artificial intelligence agent and the artificial intelligence agent performs learning such that the gap between the base line and the output value is minimized, thereby improving learning ability and learning speed of the artificial intelligence agent.

In addition, the first line of the base line indicates the output value according to maximum control of the control system and the second line of the base line indicates the set value of specific operation. Accordingly, according to the present invention, a goal of rapidly reaching a set value and a goal of stabilizing a system such as reduction of overshoot or fluctuation of an output value are simultaneously given to the artificial intelligence agent.

Moreover, even when the same control system performs the same operation, the output value may be changed according to a place where the control system is installed.

For example, even when the valve of a heating system installed in Thailand having a hot climate and the valve of a heating system installed in Russia having a cold climate are equally opened by 80%, the average rate of change of the output value in Thailand and the average rate of change of the output value in Russia may be different.

As another example, an average rate of change of an output value in a first building with good insulation and an average rate of change of an output value in a second building with poor insulation may be different from each other.

However, the first line of the present invention is set based on the output value by maximum control in an environment in which the control system is installed. That is, the first line is set according to the characteristics of the environment in which the control system is installed and the artificial intelligence agent performs reinforcement learning in order to follow the first line. Therefore, according to the present invention, it is possible to find an optimal control function suitable for an environment in which the control system is installed.

Meanwhile, the artificial intelligence unit according to the present invention may set at least one of one or more base lines and a reward based on a gap between the one or more base lines and an output value, according to a plurality of operation goals of a control system, and perform reinforcement learning based on the gap between the one or more base lines and the output value.

Here, the plurality of operation goals of the control system may include at least one of a goal that an output value rapidly reaches a set value, a goal of reducing fluctuation of the output value, a goal of reducing overshoot of the output value, a goal that the output value follows, and a goal that the output value avoids.

First, a method of setting a reward based on a gap between one or more base lines and an output value, according to a plurality of operation goals of a control system, and performing reinforcement learning will be described.

Figure 4:
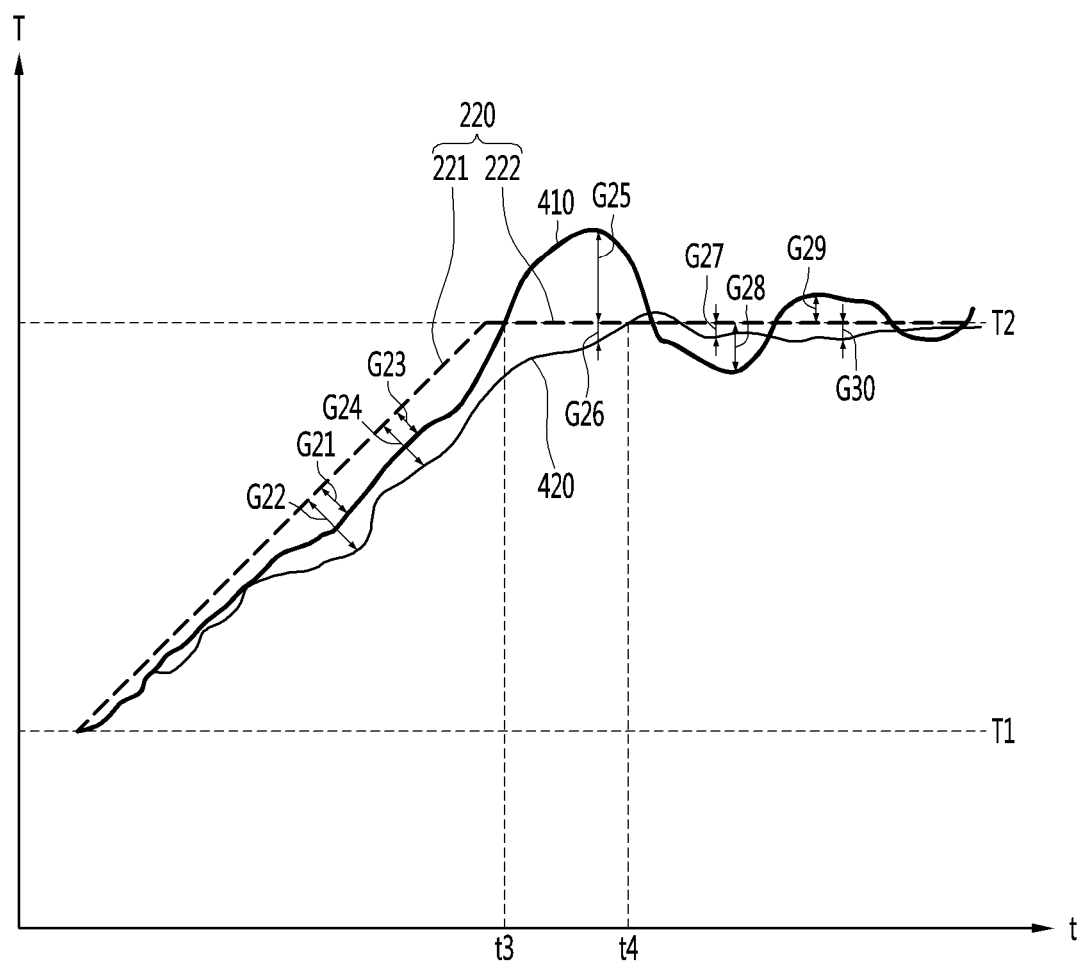
FIG. 4 is a diagram illustrating a method of giving different rewards according to a position of a gap according to an embodiment of the present invention.

FIG. 4 is a diagram illustrating a method of giving different rewards according to a position of a gap according to an embodiment of the present invention.

The artificial intelligence unit 120 may set a reward based on a gap between one or more base lines and an output value, according to a plurality of operation goals of a control system.

For example, the artificial intelligence unit 120 may set a base line 220 according to a goal that the output value follows, set a reward based on a gap between a first line 221 and the output value, according to a goal that the output value rapidly reaches a set value, and set a reward based on a gap between a second line 222 and the output value, according to a goal of reducing overshoot and fluctuation of the output value.

In this case, the artificial intelligence unit 120 may give different rewards according to the position of the gap between the base line and the output value.

Specifically, the artificial intelligence unit 120 may give a first reward based on the gap between the first line 221 and the output value and give a second reward based on the gap between the second line 222 and the output value. In this case, the first reward and the second reward may be different from each other.

For example, assume that the output value obtained when the control system performs control according to the control value of the control function including the first parameter is a first output value 410 and the first reward is greater than the second reward.

The gaps G21, G23, G25, G27 and G29 between the base line 220 and the first output value 410 may include gaps G21 and G23 between the first line 221 and the first output value 410 and the gaps G25, G27 and G29 between the second line 222 and the first output value 410.

Meanwhile, the first reward is given as the gaps G21 and G23 between the first line 221 and the first output value 410 are small and the second reward is given when the gaps G25, G27 and G29 between the second line 222 and the first output value 410 are small. In addition, the first reward may be greater than the second reward.

For example, when the first gap G21 between the first line 221 and the first output value 410 is 10 and the second gap G29 between the second line 222 and the first output value 410 is 10, a reward of 5 may be given to the first gap G21 and a reward of 2 may be given to the second gap G29.

Accordingly, when an optimal control function following the base line in a state in which the first reward is greater than the second reward is acquired, the output value according to the optimal control function may be closer to the first line 221 than the second line 222. That is, the gap between the output value according to the optimal control function and the first line 221 may be less than the gap between the output value according to the optimal control function and the second line 222.

For example, if it is assumed that the output value according to the optimal control function is a first output value 410 when the first reward is greater than the second reward, the first output value 410 may be closer to the first line 221 than the second line 222.

In contrast, assume that the output value obtained when the control system performs control according to the control value of the control function including the second parameter is a second output value 420 and the first reward is less than the second reward.

The gaps G22, G24, G26, G28 and G30 between the base line 220 and the second output value 420 may include the gaps G22 and G24 between the first line 221 and the second output value 420 and the gaps G26, G28 and G30 between the second line 222 and the second output value 420.

Meanwhile, the first reward is given as the gaps G22 and G24 between the first line 221 and the second output value 420 are small and the second reward is given as the gaps G26, G28 and G30 between the second line 222 and the second output value 420 is small.

Further, the first reward may be less than the second reward.

For example, when the first gap G22 between the first line 221 and the first output value 420 is 10 and the second gap G28 between the second line 222 and the first output value 420 is 10, a reward of 2 may be given to the first gap G22 and a reward of 4 may be given to the second gap G28.

Accordingly, when an optimal control function following the base line in a state in which the first reward is less than the second reward is acquired, the output value according to the optimal control function may be closer to the second line 222 than the first line 221. That is, the gap between the output value according to the optimal control function and the second line 222 may be less than the gap between the output value according to the optimal control function and the first line 221.

For example, if it is assumed that the output value according to the optimal control function is the second output value 420 when the first reward is less than the second reward, the second output value 420 may be closer to the second line 222 than the first line 221.

As described above, setting the first line may serve to provide the artificial intelligence unit 120 with a goal of rapidly reaching the set value and setting the second line 222 may serve to provide the artificial intelligence unit 120 with a goal of reducing overshoot of the output value or fluctuation of the output value above or below the set value after reaching the set value.

That is, in the present invention, after weighting various operational goals in a manner of giving different rewards according to the position of the gap, the artificial intelligence agent may find an optimal parameter according to the weighted operational goals.

For example, referring to the first output value 410, when a greater reward is given to the gap between the first line 221 and the output value, a point of time t3 when the output value reaches the set value may be advanced but overshoot may be increased or fluctuation of the output value above or below the set value may be increased. Accordingly, this may be advantageous in terms of rapid control to the set value but may be disadvantageous in terms of power consumption and system stabilization.

For example, referring to the second output value 420, when a greater reward is given to the gap between the second line 222 and the output value, a point of time t4 when the output value reaches the set value may be delayed and overshoot may be decreased or fluctuation of the output value above or below the set value may be decreased. Accordingly, this may be disadvantageous in terms of rapid control to the set value, but may be advantageous in terms of power consumption and system stabilization.

That is, the present invention is advantageous in that the reward is changed according to the position of the gap to variously combine various operational goals according to a degree of importance and to acquire an optimal parameter.

Although different rewards are given to the gap between the first line and the output value and the gap between the second line and the output value in the above description, the present invention is not limited thereto and the magnitude of the reward may be variously changed according to the operational goal.

For example, when desiring to give a high weight to an operational goal of minimizing overshoot, a greater reward may be given to the gap G25 at the position where overshoot occurs with the base line 220 than the other gaps G27 and G29.

As another example, when desiring to give a high weight to a goal of reducing fluctuation of the output value above or below the set value to rapidly stabilize the system, a greater reward may be given to the gaps G27 and G29 at the position where the output value fluctuates above or below than the set value than the gap G25.

Figure 5:
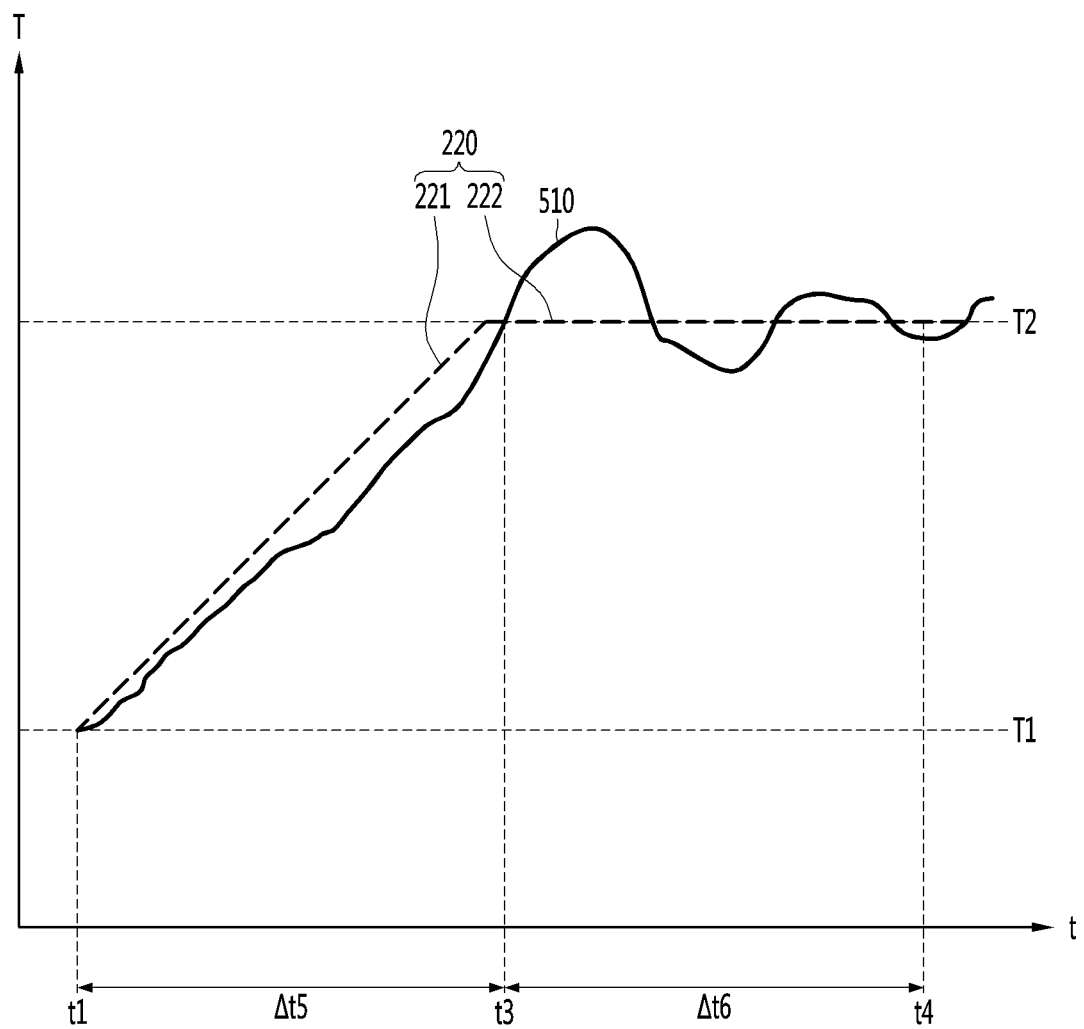
FIG. 5 is a diagram illustrating a comparison range between a base line and an output line according to an embodiment of the present invention.

FIG. 5 is a diagram illustrating a comparison range between a base line and an output line according to an embodiment of the present invention.

The artificial intelligence unit 120 may perform reinforcement learning such that the output value 510 according to control of the control system follows the base line 220.

In this case, the artificial intelligence unit 120 may perform reinforcement learning such that an output value 510 follows a first line 221 until the output value 510 reaches a set value T2 and follows the second line 222 after the output value 510 reaches the set value T2.

Meanwhile, a time from a point of time t1 when the control system starts to operate to a point of time t3 when the output value 510 reaches the set value T2 is referred to as a first time Δt5.

The artificial intelligence unit 120 may perform reinforcement learning such that the output value 510 follows the first line 221 for the first time Δt5 until the output value 510 reaches the set value T2 and the output value follows the second line 222 for a second time Δt6 after the output value 510 reaches the set value T2.

That is, the artificial intelligence unit 120 may perform reinforcement learning by giving a reward to the gap between the output value 510 and the base line 220 for the first time Δt5 and the second time Δt6.

In this case, the first time Δt5 and the second time Δt6 may be proportional by the following equation. Here, α may be a proportional constant.

$$\text{Second time} = \alpha \ast \text{first time} \quad [\text{Equation 2}]$$

For example, if the proportional constant is 1 and the first time from the point of time when the control system starts to operate to the point of time when the output value reaches the set value is 2 minutes, the artificial intelligence unit 120 may perform reinforcement learning such that the output value follows the first line 221 for 2 minutes until the output value reaches the set value and the output value follows the second line 222 for 2 minutes after the output value reaches the set value.

As another example, if the proportional constant is 0.8 and the first time from the point of time when the control system starts to operate to the point of time when the output value reaches the set value is 2 minutes, the artificial intelligence unit 120 may perform reinforcement learning such that the output value follows the first line 221 for 2 minutes until the output value reaches the set value and the output value follows the second line 222 for 1 minute 36 seconds after the output value reaches the set value.

Fluctuation of the output value above or below the set value is a response to input of energy. As the amount of input energy is increased, a time when the output value fluctuates is increased.

For example, in the heating system, when the output value is from 25° C. to a set value of 30° C., the first time Δt5 is increased and the amount of water for heating, which passes through the pipe by opening the valve, is increased as compared to the case where the output value is from 25° C. to a set value of 26° C. Therefore, when the output value is from 25° C. to a set value of 30° C., fluctuation of the temperature after the temperature reaches to the set value is continued for a longer time.

In the present invention, the first time Δt5 and the second time Δt6 are proportional. Accordingly, the present invention is advantageous in that reinforcement learning is performed after monitoring the output value for a longer time as the amount of input energy is increased, thereby calculating an optimal parameter.

Figure 6:
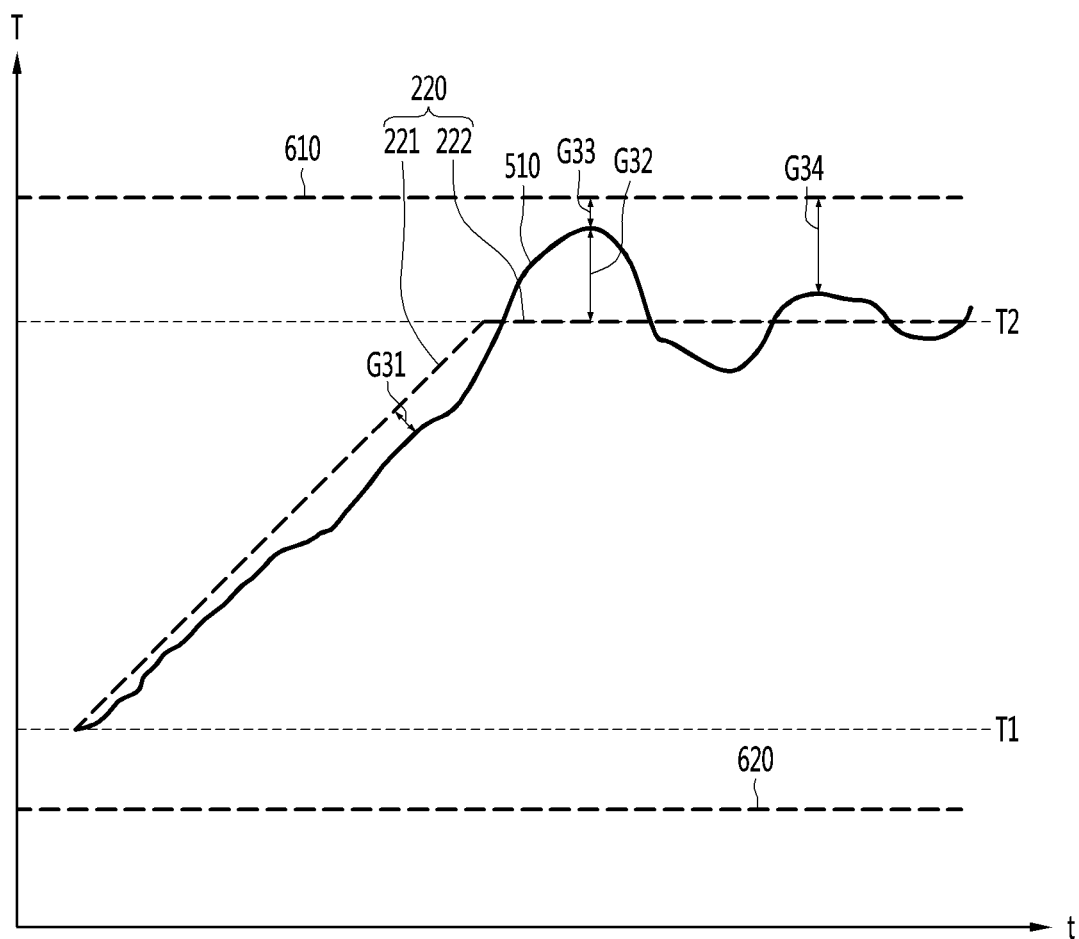
FIG. 6 is a diagram illustrating a method of setting an additional base line and performing reinforcement learning in order to avoid the additional base line according to an embodiment of the present invention.

FIG. 6 is a diagram illustrating a method of setting an additional base line and performing reinforcement learning in order to avoid the additional base line according to an embodiment of the present invention.

As described above, the base line 220 is ideal change of the output value according to control of the control system.

In contrast, the second base line 610 may mean an avoidance goal of avoiding the output value according to control of the control system.

For example, in the heating system, the second base line 610 may mean a specific temperature.

For example, in order to prevent the temperature to being increased to a specific temperature or more to prevent the user from feeling discomfort or to prevent the temperature to being increased to a specific temperature or more to prevent excessive power consumption, the second base line 610 may be set to a specific temperature. For example, the set value may be 30° C. and the specific temperature may be 40° C.

In addition, the artificial intelligence unit 120 may perform reinforcement learning such that the output value follows the base line and avoids the second base line 610, thereby updating the control function for providing the control value to the control system. Here, avoiding the second base line may mean moving the output value according to control of the control system to be maximally away from the second base line 610.

Specifically, the artificial intelligence unit 120 may give a reward based on the gaps G31 and G32 between the base line 220 and the output value 510 and give a penalty based on the gaps G33 and G34 between the second base line 610 and the output value 510.

More specifically, as the gaps G31 and G32 between the base line 220 and the output value are decreased, the reward may be increased and, as the gaps G33 and G34 between the second base line 610 and the output value 510 are decreased, the penalty may be increased.

The artificial intelligence unit 120 may acquire one or more parameters for maximizing the sum of the reward and the penalty and change the parameter of the existing control function to a newly acquired parameter when the one or more parameters for maximizing the sum of the reward and the penalty are acquired, thereby updating the existing control function.

In this manner, the artificial intelligence unit 120 may continuously perform reinforcement learning, thereby acquiring an optimal parameter for enabling the output value according to control of the control system to follow the base line and to avoid the second base line.

In the present invention, the artificial intelligence agent may perform reinforcement learning based on various goals, by setting a plurality of base lines 220 and 610.

Specifically, if it is assumed that there is only a base line 220, an optimal parameter for enabling the output value to most closely follow the base line 220 is determined by an average of the gaps between the base line 220 and the output value 510 (that is, the area of a space between the output value and the base line). Accordingly, even when the average of the gaps is minimized, large overshoot may occur and thus the output value may approach a specific temperature causing an uncomfortable feeling to the user according to overshoot.

Accordingly, the present invention is advantageous in that the plurality of base lines 220 and 610 is set and the artificial intelligence agent learns the optimal parameter for enabling the output value to follow or avoid the base line, thereby calculating the optimal parameter capable of achieving various goals.

Meanwhile, although the two base lines 220 and 610 are set in the above description, the number of base lines is not limited thereto.

For example, in the air conditioning system, the base line 220, the second base line 610 and a third base line 620 may be set. The base line 220 may mean a temperature which the output value (the output temperature) follows, the second base line 610 is a high temperature (e.g., 40° C.) which the output value (the output temperature) avoids, and the third base line 620 may mean a low temperature (e.g., 15° C.) which the output value (the output temperature) avoids. Therefore, the artificial intelligence unit 120 may calculate an optimal parameter for enabling the temperature according to control of the air conditioning system to follow the base line in a range of 15° C. to 40° C.

Meanwhile, as the gaps G31 and G32 between the base line 220 and the output value 510 are decreased, the reward is increased, and as the gaps G33 and G34 between the second base line 610 and the output value 510 are decreased, the penalty is increased. In this case, the magnitude of the penalty may be greater than that of the reward.

For example, when the gap between the base line 220 and the output value 510 is 10 and the gap between the second base line 610 and the output value 510 is 10, the reward of 5 may be given to the gap between the base line 220 and the output value 510 and the penalty of 10 may be given to the gap between the second base line 610 and the output value 510.

The specific temperature indicated by the second base line 610 may be a threshold which the output value 510 should not exceed. Accordingly, in the present invention, by differentiating the magnitudes of the reward and the penalty, a higher weight is given to a goal of avoiding the specific temperature indicated by the second base line 610 than a goal of following the base line 220.

Figure 7:
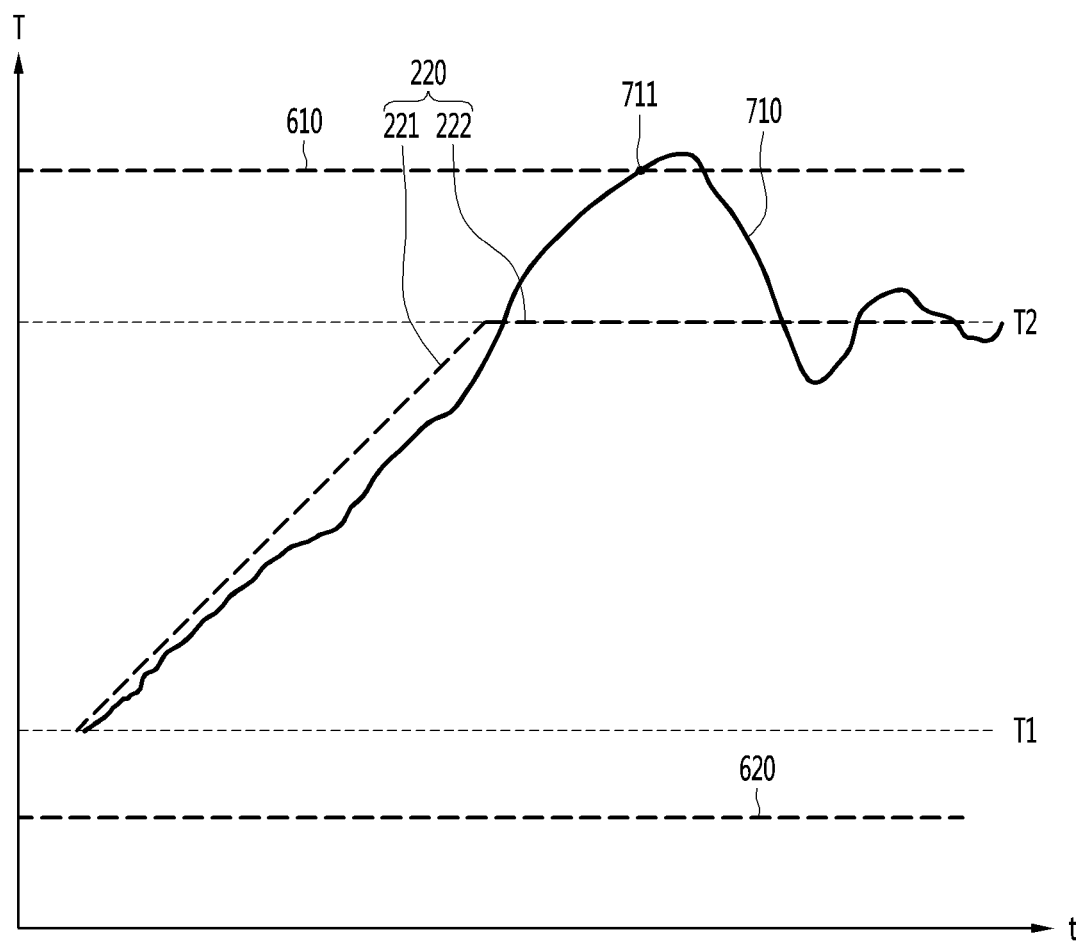
FIG. 7 is a diagram illustrating a method of discarding a parameter when an output value matches one point on a second base line according to an embodiment of the present invention.

FIG. 7 is a diagram illustrating a method of discarding a parameter when an output value matches one point on a second base line according to an embodiment of the present invention.

Even when reinforcement learning is performed such that the output value follows the base line 220 and avoids the second base line 610, there is still a possibility that the output value approaches the second base line 610, and the output value may reach the second base line 610.

Meanwhile, the value indicated by the second base line 610 may be a threshold which the output value 710 should not exceed.

Accordingly, the artificial intelligence unit 120 may discard the parameter of the control function for providing the control value to the control system, when the output value 710 matches one point 711 on the second base line 610. In addition, the artificial intelligence unit 120 may not use the discarded parameter as the parameter of the control function.

Figure 8:
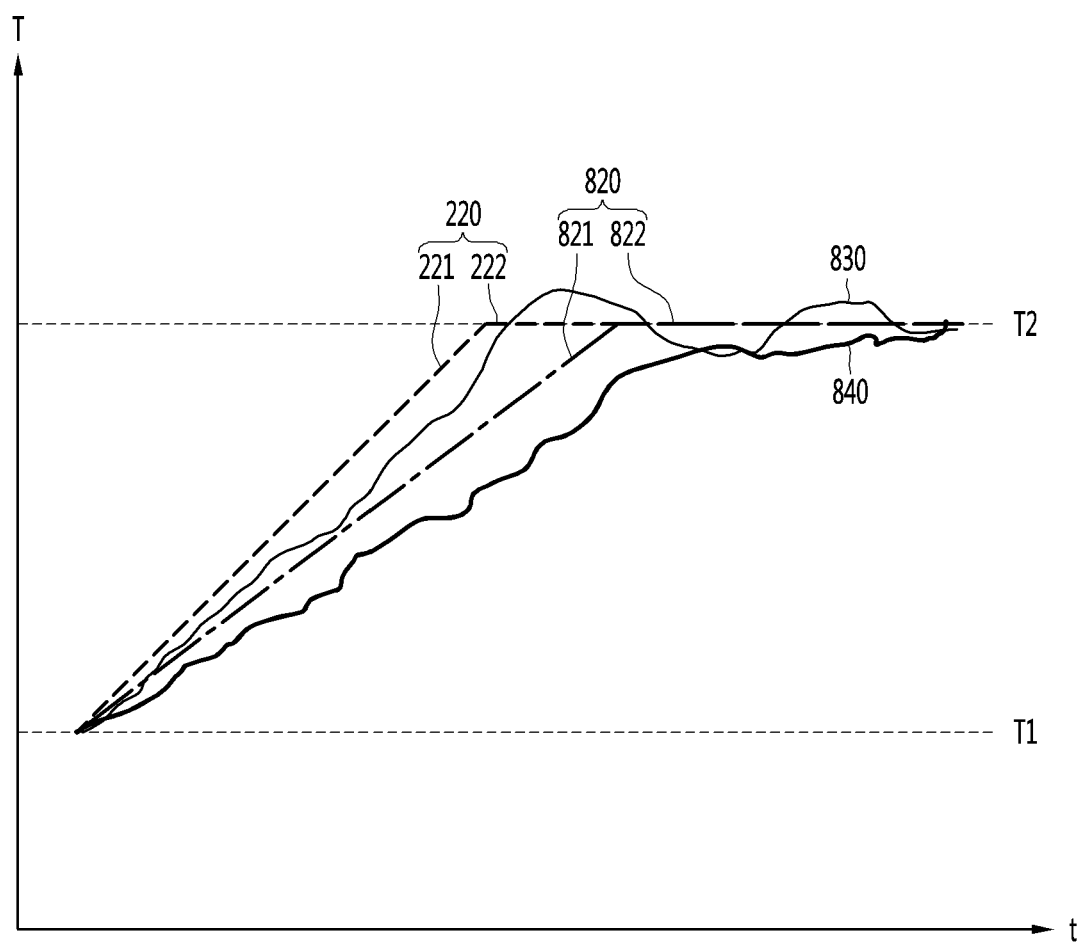
FIG. 8 is a diagram illustrating a method of resetting a base line according to change in an environmental condition according to an embodiment of the present invention.

FIG. 8 is a diagram illustrating a method of resetting a base line according to change in an environmental condition according to an embodiment of the present invention.

The artificial intelligence unit 120 may reset the base line according to change in the environmental condition. The environmental condition may be an external factor for changing the object to be controlled by the control system. In other words, the object to be controlled by the control system may be changed by a factor other than control of the control system, and the factor may be referred to as the environmental condition.

For example, if the control system is a heating system, the object to be controlled by the heating system is a temperature. The temperature may be changed not only by control of the heating system, but also by time, date, season, weather, etc. In this case, the environmental condition may be time, date, season, weather, etc.

As described above, the first line 221 of the base line 220 indicates ideal change of the output value according to control of the control system and means change in the output value according to maximum control of the control system.

Meanwhile, ideal change of the output value according to control of the control system may be changed according to change in the environmental condition.

For example, even when the valve of the heating system is opened by the same degree, the rate of change of the output value (temperature) of summer and the rate of change of the output value (temperature) of winter may be different from each other.

Accordingly, the optimal parameter calculated in summer by performing reinforcement learning after setting change in the output value according to maximum control of the control system to the base line 221 may be different from the optimal parameter applied in winter.

Accordingly, the artificial intelligence unit 120 according to the embodiment of the present invention may reset the base line 220 according to change in the environmental condition.

Specifically, the collection unit 110 may directly acquire the output value or receive the output value from the outside.

In addition, the artificial intelligence unit 120 may sense change in the output value. In this case, change in the output value may mean change in the output value irrespective of control of the control system, instead of change in the output value according to control of the control system.

When change in the output value is sensed, the artificial intelligence unit 120 may control the control system to perform maximum control.

Further, while the control system performs maximum control, the artificial intelligence unit 120 may acquire the output value according to maximum control of the control system. Furthermore, the artificial intelligence unit 120 may set a first line 821 of a new base line 820 based on the acquired output value.

When the first line 821 of the new base line 820 is set, the artificial intelligence unit 120 may perform reinforcement learning such that the output value according to control of the control system follows the new base line 820.

The first output value 830 shown in FIG. 8 indicates an output value obtained by performing reinforcement learning in order to follow the existing base line 220 to acquire an optimal control function and to perform control using a control value provided by the acquired control function.

The second output value 840 shown in FIG. 8 indicates an output value obtained by performing reinforcement learning in order to follow the new base line 820 to acquire an optimal control function and to perform control using a control value provided by the acquired control function.

As the environmental condition is changed by season, date, or the other variables, an optimal PID parameter suitable for the current environmental condition may be changed. However, conventionally, since the parameter is set through human intuition and experience, it is impossible to appropriately optimize the parameter in correspondence with change in the environmental condition.

However, the present invention is advantageous in that the base line is changed when the environmental condition is changed and reinforcement learning is performed again in order to follow the changed base line, thereby optimizing the parameter in correspondence with change in the environmental condition.

Figure 9:
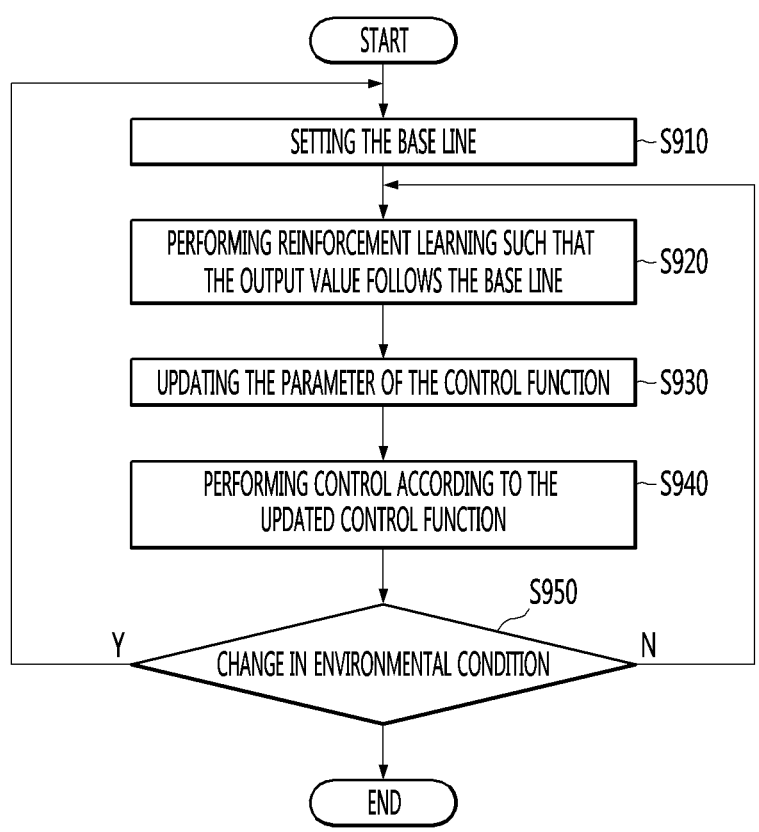
FIG. 9 is a flowchart illustrating an operation method of an artificial intelligence device and a control system according to an embodiment of the present invention.

FIG. 9 is a flowchart illustrating an operation method of an artificial intelligence device and a control system according to an embodiment of the present invention.

The artificial intelligence unit 120 may set the base line (S910).

Specifically, the artificial intelligence unit 120 may control the control system to perform maximum control.

In addition, the artificial intelligence unit 120 may set the base line according to the output value acquired while the control system performs maximum control.

When the base line is set, the artificial intelligence unit 120 may perform reinforcement learning such that the output value according to control of the control system follows the base line (S920).

Specifically, the artificial intelligence unit 120 may variously change the parameter of the control function and provide the control function with the changed parameter to the control system.

In this case, the control system may perform control according to the control function received from the artificial intelligence unit 120.

Specifically, the control system may input the current value and the set value to the control function received from the artificial intelligence unit 120, thereby calculating the control value. In addition, the control system may perform control according to the calculated control value.

In this case, the artificial intelligence unit 120 may acquire the output value according to control of the control system. In addition, the artificial intelligence unit 120 may acquire the parameter for mostly closely following the base line using the acquired output value and the parameter used to acquire the output value.

Meanwhile, the artificial intelligence unit 120 may update the parameter of the control function (S930).

Specifically, when the parameter for most closely following the base line is acquired, the artificial intelligence unit 120 may change the existing control function to a control function including the newly acquired parameter.

Meanwhile, the control system may perform control according to the updated control function (S940).

That is, since the parameter for most closely following the base line is acquired through reinforcement learning, the control system may perform control according to the updated control function.

Meanwhile, when the environmental condition is not changed (S950), the artificial intelligence unit 120 may repeat S920 to S940 to continuously repeat the process of finding the optimal parameter based on the same base line.

Meanwhile, when the environmental condition is changed (S950) (or when change in the environmental condition is equal to or greater than a predetermined value), the artificial intelligence unit 120 may reset the base line (S910). In addition, the artificial intelligence unit 120 may repeat S920 to S940 to continuously repeat the process of finding the optimal parameter based on the newly set base line.

Figure 10:
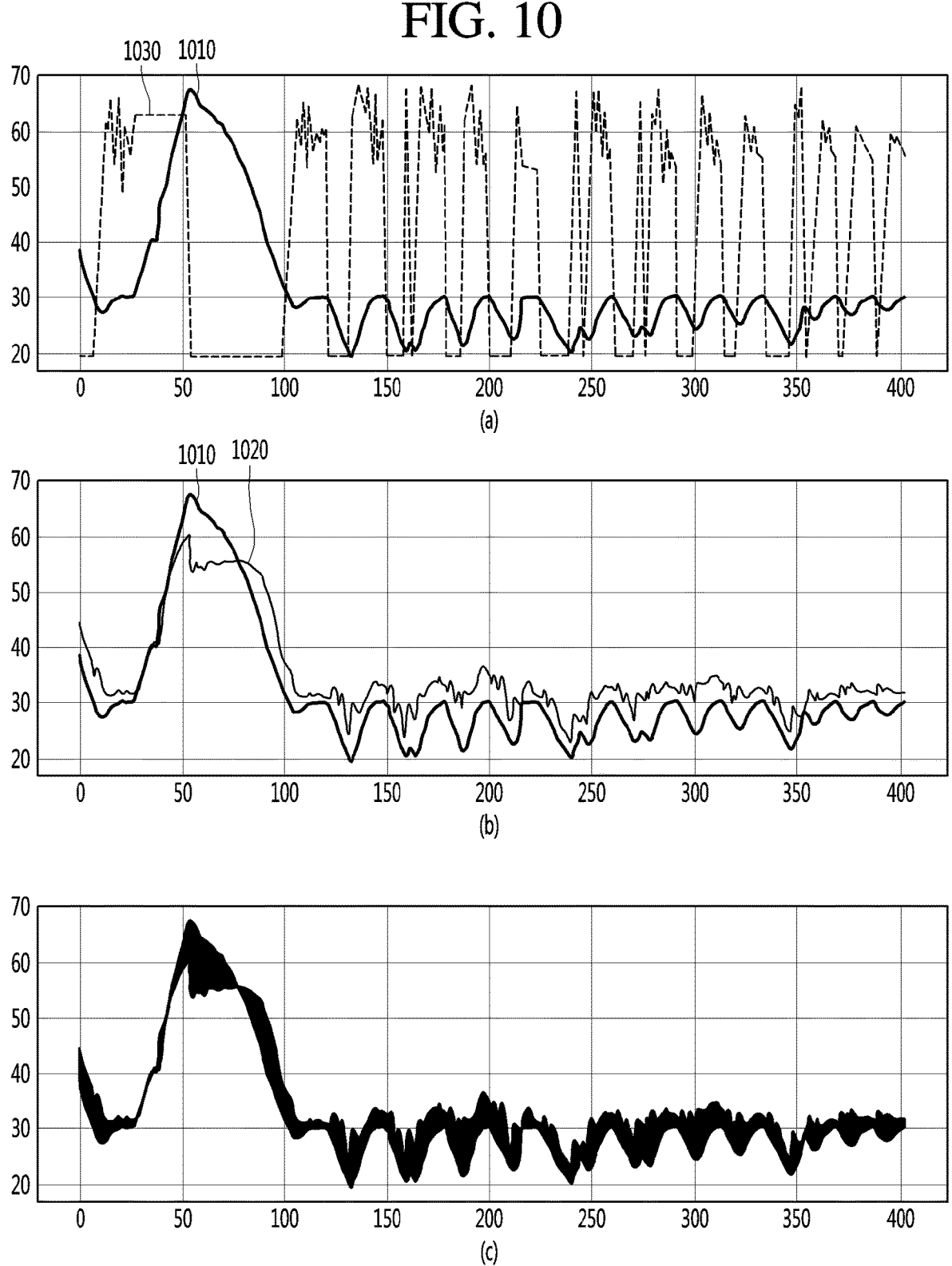
FIG. 10 is a diagram illustrating a method of pre-learning a pattern of an output value according to an embodiment of the present invention.

FIG. 10 is a diagram illustrating a method of pre-learning a pattern of an output value according to an embodiment of the present invention.

The pattern of the output value may mean change in the output value according to control of the control system.

For example, the pattern of the output value in the heating system may indicate how the temperature according to control of the heating system is changed when the valve is opened by a predetermined degree.

Meanwhile, change in the output value according to control of the control system may mean that a current behavior (that is, current control) affects a next step (output value) and a behavior at the next step (control using the current output value) affects a subsequent step (output value) thereof.

Accordingly, the artificial intelligence unit 120 may learn the pattern of the output value using a recurrent neural network (RNN) for learning data changed over time, such as time-series data. In this case, a long-short term memory (LSTM) method may be used.

Meanwhile, the artificial intelligence unit 120 may learn the control information of the control system and the output value according to the control information in an environment, in which the control system is installed, using the RNN.

Specifically, the data learned using the RNN may be time-series data of the control information and the output value according to the control information in the environment, in which the control system is installed.

For example, in the heating system, the data learned using the RNN may be time-series data of the temperature according to the degree of opening of the valve and the degree of opening of the valve in the environment, in which the heating system is installed.

In this case, the artificial intelligence unit 120 may learn data for a predetermined period using the RNN to acquire the pattern of the output value.

Meanwhile, the RNN may be included in the artificial intelligence unit 120 and the artificial intelligence unit 120 may directly acquire the pattern of the output value using the RNN, or an external device including the RNN may acquire the pattern of the output value and then the artificial intelligence device 100 may store the pattern of the output value in a storage unit.

FIG. 10a shows past control information (valve opening) 1030 and an output value (temperature) 1010 according to the control information at a specific place where the heating system is installed.

FIG. 10b shows the result that the artificial intelligence unit 120 learns the past control information (valve opening) 1030 and the output value (temperature) 1010 according to the control information at the specific place where the heating system is installed using the RNN and predicts temperature change 1020 based on the result of learning and current control information.

In FIG. 10c, the past temperature change 1010 and the predicted temperature change 1020 are substantially similar and the rate of concordance of 95.49% is achieved.

Figure 11:
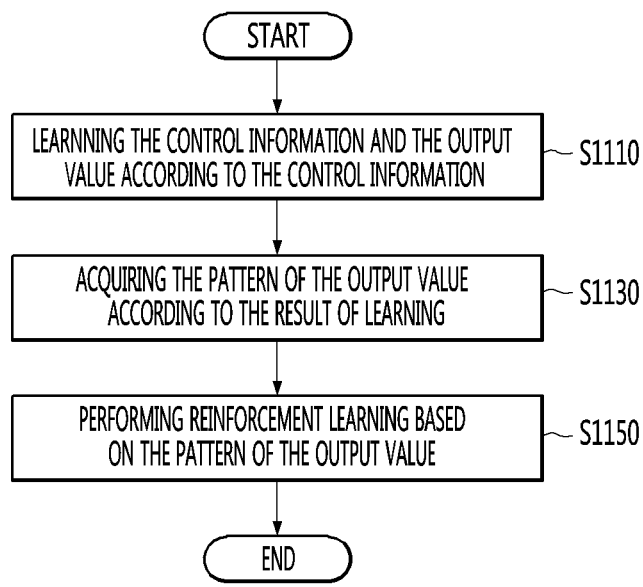
FIG. 11 is a flowchart illustrating a method of acquiring a pattern of an output value using a recurrent neural network and a method of performing reinforcement learning based on the pattern of the output value.

FIG. 11 is a flowchart illustrating a method of acquiring a pattern of an output value using a recurrent neural network and a method of performing reinforcement learning based on the pattern of the output value.

The artificial intelligence unit 120 may learn the control information of the control system and the output value according to the control information in the environment, in which the control system is installed, using the RNN (S1110).

Specifically, the artificial intelligence unit 120 may learn the control information and the output value of the control information in the environment, in which the control system is installed, for a considerable period.

For example, if the artificial intelligence unit 120 will be installed in the heating system of building A, the artificial intelligence unit 120 may learn log data obtained by recording the control information of the heating system of the building A and the temperature according to the control information for one year using the RNN.

In this case, the artificial intelligence unit 120 may acquire the pattern of the output value according to the result of learning (S1130).

In addition, the artificial intelligence device, in which the result of learning is stored in the storage unit, may be connected to the control system to provide the control function to the control system to perform reinforcement learning.

In this case, the artificial intelligence unit 120 performs reinforcement learning based on the pattern of the output value (S1150).

Specifically, the artificial intelligence unit 120 may perform reinforcement learning while variously changing the parameter of the control function in a try and error manner.

In this case, the pattern of the output value may be provided as an environment provided to the agent in reinforcement learning.

That is, when the pattern of the output value is not learned using the RNN, since the output value is the environment provided to the agent, it is possible to increase a time required to perform reinforcement learning.

However, when the pattern of the output value is pre-learned using the RNN, since the pattern of the output value is provided to the agent as the environment, it is possible to remarkably decrease the time required to perform reinforcement learning.

In particular, when the artificial intelligence device 100 will be sold and installed at a specific place, the seller of the artificial intelligence device 100 may obtain and pre-learn the log data of the specific place and install the artificial intelligence device 100. Therefore, it is possible to remarkably improve a reinforcement learning speed.

Meanwhile, the pattern of the output value may be updated.

For example, the artificial intelligence device 100 may learn the control information and the output value according to the control information for last one year in the environment, in which the control system is installed, through the recurrent neural network, thereby acquiring the pattern of the output value.

As another example, the pattern of the output value acquired by learning the control information and the output value according to the control information for last one year in the environment, in which the control system is installed, through the recurrent neural network may be stored in the artificial intelligence device 100.

In this case, the artificial intelligence unit 120 may periodically update the pattern of the output value. For example, on Jul. 1, 2018, the log data from Jul. 1, 2017 to Jun. 30, 2018 may be learned and the pattern of the output value may be updated and, on Aug. 1, 2018, the log data from Aug. 1, 2017 to Jul. 30, 2018 may be learned and the pattern of the output value may be updated.

The pattern of the output value may be changed over time. For example, the weather gradually gets warmer due to global warming, or heating performance gets worse due to sediment in a heating pipe.

The present invention is advantageous in that the speed of reinforcement learning can be improved by learning the latest data of the same period, grasping the pattern of the output value suitable for the current situation, and performing reinforcement learning.

Figure 12:
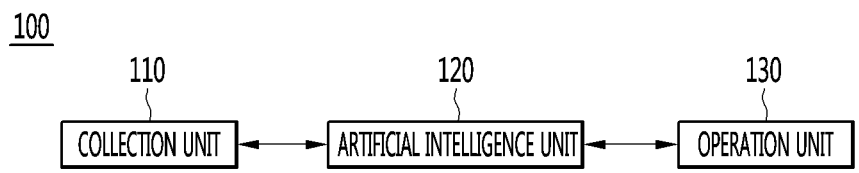
FIG. 12 is a diagram showing an artificial intelligence device configured by combining a control system, a collection unit, and an artificial intelligence unit according to an embodiment of the present invention.

FIG. 12 is a diagram showing an artificial intelligence device configured by combining a control system, a collection unit, and an artificial intelligence unit according to an embodiment of the present invention.

The artificial intelligence device 100 may include a collection unit 120, an artificial intelligence unit 110, and an operation unit 130.

For the collection unit 120 and the artificial intelligence unit 110, refer to the collection unit and the artificial intelligence unit of FIG. 1.

Although not shown, the artificial intelligence device 100 may also include a storage unit. The storage unit may store a control function, a pattern of an output value, an application program for reinforcement learning, and an application program for learning time-series data using a recurrent neural network.

Meanwhile, the operation unit 130 may include components according to the function of the control system.

Specifically, the control system may mean all systems for collecting a current value, outputting a control value using the collected current value, a set value and a control function and performing control according to the output control value, such as an air conditioning system, an energy management system, a motor control system, an inverter control system, a pressure control system, a flow rate control system, a heating/cooling system, etc.

If the control system is a heating system, the collection unit 120 may include a temperature sensor. An operation unit 130 may include a valve for controlling flow of water for heating and a device for controlling the degree of opening of the valve under control of the artificial intelligence unit 110.

In this case, the artificial intelligence unit 120 may control the operation unit 130 to perform maximum control (open the valve by 100%) and set the base line using the output value acquired when maximum control is performed.

In addition, the artificial intelligence unit 120 may input a current temperature and a target temperature to a control function to output a control value, open the valve according to the output control value, and perform reinforcement learning such that the temperature acquired by opening the valve follows the base line.

The artificial intelligence unit 120 may update the parameter of the control function according to the result of reinforcement learning.

Figure 13:
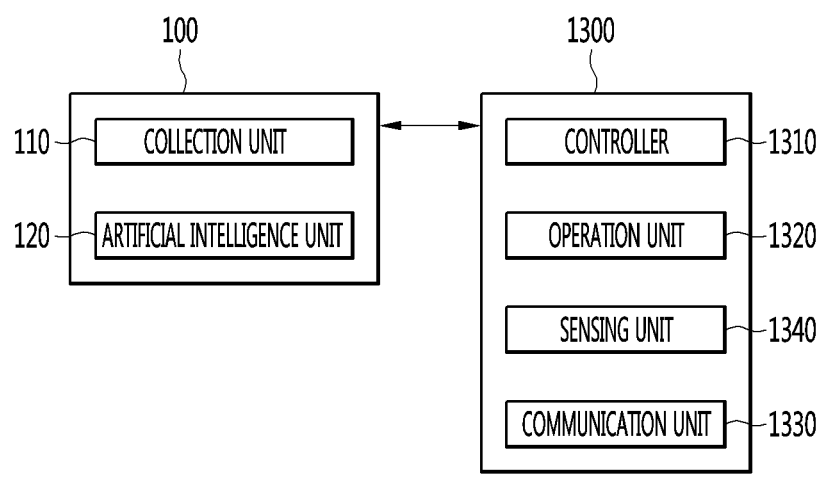
FIG. 13 is a block diagram illustrating an embodiment in which a control system and an artificial intelligence device are separately configured and the artificial intelligence device collects an output value according to an embodiment of the present invention.

FIG. 13 is a block diagram illustrating an embodiment in which a control system and an artificial intelligence device are separately configured according to an embodiment of the present invention.

The artificial intelligence device 100 may include a collection unit 110 and an artificial intelligence unit 120.

For the collection unit 110 and the artificial intelligence unit 120, refer to the collection unit and the artificial intelligence unit of FIG. 1.

Although not shown, the artificial intelligence device 100 may also include a storage unit. The storage unit may store a control function, a pattern of an output value, an application program for reinforcement learning, and an application program for learning time-series data using a recurrent neural network.

Meanwhile, a control system 1300 may include a controller 1310, an operation unit 1320, a communication unit 133,0 and a sensing unit 1340.

Although not shown, the control system 1300 may also include a storage unit. The storage unit may store an application program for driving the operation unit 1320, a control function, etc.

The sensing unit 1340 may sense the output value according to control of the control system.

The controller 1310 may control overall operation of the control system 1300.

Meanwhile, the communication unit 1330 of the control system 1300 and the collection unit 120 of the artificial intelligence device 100 may be connected to each other to perform communication with each other.

The artificial intelligence unit 110 may transmit a control command for enabling the operation unit 130 to perform maximum control (open the valve by 100%) to the control system 1300 through the collection unit 120.

In this case, the controller 1310 may perform maximum control and transmit, to the artificial intelligence device 100, the output value acquired when maximum control is performed.

In this case, the artificial intelligence unit 110 may set the base line using the output value acquired when the control system 1300 performs maximum control.

The controller 1310 may perform control based on the control value provided by the control function.

Specifically, the controller 1310 may input a current value and a set value to a control function to output a control value, perform control according to the output control value, and sense the output value obtained by performing control through the sensing unit 1340. When the output value is sensed, the controller 1310 may input the sensed output value and the set value to the control function to output the control value, perform control according to the output control value and sense the output value obtained by performing control through the sensing unit 1340.

That is, the controller 1310 may perform a general control loop feedback mechanism.

The controller 1310 may transmit the control information of the control system and the output value sensed by the sensing unit 1340 to the artificial intelligence unit 100 through the communication unit 1330.

Meanwhile, the artificial intelligence unit 110 may perform reinforcement learning such that the output value according to control of the control system 1300 follows the base line.

When a new parameter needs to be learned, the artificial intelligence unit 110 may transmit the control function including the new parameter to the control system 1300. In this case, the control system 1300 may perform control using the received control function, sense the output value according to control of the control system 1300, and transmit the output value to the artificial intelligence device 100.

Meanwhile, when a new parameter is acquired according to the result of reinforcement learning, the artificial intelligence unit 110 may update the existing control function to a control function including a new parameter. The artificial intelligence unit 110 may transmit the updated control information to the control system 1300.

In this case, the control system 1300 may perform control using the updated control function.

Figure 14:
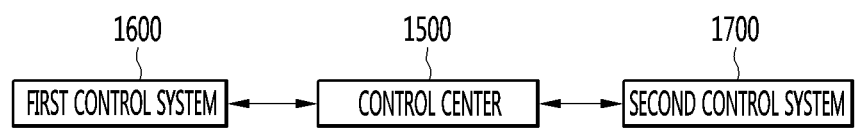
FIG. 14 is a block diagram illustrating an embodiment in which artificial intelligence devices respectively corresponding to a plurality of control systems are integrally configured in a control center according to an embodiment of the present invention.

FIG. 14 is a block diagram illustrating an embodiment in which artificial intelligence devices respectively corresponding to a plurality of control systems are integrally configured in a control center according to an embodiment of the present invention.

For example, the control center 1500 may be a device for integrally managing heating systems of a specific building. A first control system 1600 may be a control device for controlling heating of a first space of the specific building and a second control system 1700 may be a control device for controlling heating a second space of the specific building.

The first control system 1600 may include a controller, an operation unit, a communication unit, and a sensing unit. The description of the controller, the operation unit, the communication unit, and the sensing unit shown in FIG. 13 is applicable without change, except that the communication unit communicates with the control center 1500.

Further, the second control system 1700 may include a controller, an operation unit, a communication unit and a sensing unit. The description of the controller, the operation unit, the communication unit and the sensing unit shown in FIG. 13 is applicable without change, except that the communication unit communicates with the control center 1500.

The control center 1500 may include a collection unit and an artificial intelligence unit.

The description of the collection unit and the artificial intelligence unit shown in FIG. 13 is applicable to the collection unit and the artificial intelligence unit of the control center 1500 without change.

Meanwhile, the artificial intelligence unit of the control center 1500 may receive an output value according to control of the first control system 1600 from the first control system 1600 and update a first control function for providing a control value to the first control system 1600 based on reinforcement learning.

In addition, the artificial intelligence unit of the control center 1500 may receive an output value according to control of the second control system 1700 from the second control system 1700 and update a second control function for providing a control value to the second control system 1700 based on reinforcement learning.

In addition, the artificial intelligence unit of the control center 1500 may reset the base line of the first control system 1600 using an environmental condition acquired by the second control system 1700.

For example, when change in the environmental condition is sensed according to the result of sensing by the sensing unit of the second control system 1700, the artificial intelligence unit of the control center 1500 may reset the base line of the first control system 1600.

That is, the sensed information acquired by the second control system may be used to update the control function of the first control system.

Although the PID is used as a control function in the above description, the present invention is not limited thereto.

For example, the control function may include one of proportional-integral (PI) control, proportional-derivative (PD) control, and proportional-integral-derivative (PID) control.

In addition, the control function may include all types of functions for providing the control value to the control system in order to perform feedback control.

Meanwhile, a heating system, to which the present invention is applicable, will be described.

The artificial intelligence device according to the embodiment of the present invention may be included in the heating system.

The artificial intelligence device according to the embodiment of the present invention may include a collection unit, an operation unit, and an artificial intelligence unit.

In this case, the collection unit may include a temperature sensor for sensing a temperature. Here, the temperature may be an output value according to temperature control of the heating system.

For example, the temperature sensor may be mounted in a room to be heated to sense the temperature of the room. In addition, when the heating system performs temperature control, the temperature sensor may sense the temperature of the room changed according to temperature control of the heating system.

Meanwhile, the operation unit may include a valve for controlling the flow rate of gas or liquid for temperature control of the heating system.

For example, the heating system may include a heating pipe for delivering gas or liquid to a room to be heated and a flow rate control valve mounted in the heating pipe to control the flow rate of gas or liquid. In addition, the heating system may include an operation unit (e.g., a motor) for controlling the opening degree of the valve.

Meanwhile, the artificial intelligence unit may update a control function based on reinforcement learning and control the opening degree of the valve according to a control value output from the updated control function.

Specifically, the artificial intelligence unit may perform reinforcement learning in order for the sensed temperature to follow a base line. In this case, the base line may include a first line indicating change in the sensed temperature according to maximum control of the heating system.

For example, if a control value of 100 percent is output by the control function, the heating system may perform control corresponding to the control value of 100 percent, that is, control for opening the valve 100 percent. In this case, the first line may mean change in the temperature of the room to be heated when the valve is opened 100 percent.

In addition, the base line may include a second line matching a target temperature which is a set value of the heating system.

Here, the second line may be a target value that the output value reaches when the heating system performs heating. For example, if the current temperature of the room to be heated is 24° C. and a command for increasing the temperature to 30° C. is received, the heating system may perform an operation for increasing the temperature to 30° C. In this case, the artificial intelligence unit may set a base line including a first line indicating change in the temperature at the time of maximum control of the heating system and a second line formed to match 30° C.

In addition, the artificial intelligence unit may perform reinforcement learning in order for the sensed temperature to follow the base line, thereby updating a control function.

In addition, the artificial intelligence unit may control the opening degree of the valve according to the control value output from the updated control function.

Specifically, in the heating system, the current value may be a current temperature and the set value may be a target temperature. Moreover, the artificial intelligence unit may input a difference between the current value and the set value to calculate a control value. In addition, the artificial intelligence unit may control the opening degree of the valve according to the calculated control value.

Meanwhile, the artificial intelligence unit may perform reinforcement learning using a pattern of a temperature in an environment in which the heating system is mounted.

Here, the pattern of the temperature may indicate how the temperature of the room to be heated is changed when the valve is opened by a certain degree.

The pattern of the temperature may be acquired by learning the temperature according to the control information of the heating system and the control information of the environment, in which the heating system is mounted, by a recurrent neural network (RNN).

Specifically, data learned by the recurrent neural network (RNN) may be time-series data of the temperature according to the opening degree of the valve and the opening degree of the valve in the room to be heated.

In this case, the recurrent neural network (RNN) may acquire the pattern of the output value by learning data over a predetermined period of time. The learned recurrent neural network may be installed in a storage unit included in the artificial intelligence device.

Meanwhile, the artificial intelligence unit may be used interchangeably with a central processing unit, a microprocessor, a processor, etc.

The present invention is advantageous in that a learning environment is provided to an artificial intelligence agent and the artificial intelligence agent learns a large amount of data, thereby calculating an optimal parameter regardless of various variables for determining the output value.

In addition, the present invention is advantageous in that a clear goal of following the base line is given to the artificial intelligence agent and the artificial intelligence agent performs learning such that the gap between the base line and the output value is minimized, thereby improving learning ability and learning speed of the artificial intelligence agent.

In addition, the present invention is advantageous in that the reward is changed according to the position of the gap to variously combine various goals according to a degree of importance and to acquire an optimal parameter.

In addition, the first line of the base line indicates the output value according to maximum control of the control system and the second line of the base line indicates the set value of the specific operation. According to the present invention, a goal of rapidly reaching a set value and a goal of stabilizing a system such as reduction of overshoot or fluctuation of the output value are simultaneously given to the artificial intelligence agent.

In addition, the first line of the present invention is set based on the output value by maximum control in an environment in which the control system is installed. That is, the first line is set according to the characteristics of the environment in which the control system is installed, and the artificial intelligence agent performs reinforcement learning in order to follow the first line. Therefore, according to the present invention, it is possible to find an optimal control function suitable for an environment in which the control system is installed.

The present invention is advantageous in that the reward is changed according to the position of the gap to variously combine various operational goals according to a degree of importance and to acquire an optimal parameter.

The present invention is advantageous in that reinforcement learning is performed after monitoring the output value for a longer time as the amount of input energy is increased, thereby calculating an optimal parameter.

The present invention is advantageous in that a plurality of base lines is set and the artificial intelligence agent learns the optimal parameter for enabling the output value to follow or avoid the base line, thereby calculating the optimal parameter capable of achieving various goals.

The present invention is advantageous in that the base line is changed when the environmental condition is changed and reinforcement learning is performed again in order to follow the changed base line, thereby optimizing the parameter in correspondence with change in environmental condition.

The present invention is advantageous in that the pattern of the output value is pre-learned using a recurrent neural network and the pattern of the output value is provided to the agent as an environment, thereby remarkably reducing a time required for reinforcement learning.

The invention can also be embodied as computer readable codes on a computer-readable recording medium. The computer-readable recording medium is any data storage device that can store data which can be thereafter read by a computer system. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the controller 180 of the mobile terminal. The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An automatic control artificial intelligence device comprising:
   a sensor configured to acquire an output value according to control of a control system; and
   at least one processor configured to:
   set at least one or more base lines and a reward based on a gap between the one or more base lines and the output value acquired by the sensor according to a plurality of operation goals of the control system; and
   update a control function for providing a control value to the control system by performing reinforcement learning based on the gap between the one or more base lines and the output value,
   wherein the base line includes a first line and a second line,
   the first line indicates change in the output value obtained when the control system performs maximum control according to the maximum control value of the control function, to provide the one or more processors with a goal of rapidly reaching a set value,
   the second line is a goal value of the output value when specific operation is performed, to provide the one or more processors with a goal of reducing overshoot of the output value or fluctuation of the output value above or below the set value after reaching the set value, and
   wherein the one or more processors is configured to set a first reward based on a first gap between the first line and the output value according to the goal that the output value rapidly reaches a set value, and a second reward different from the first reward based on a second gap between the second line and the output value according to the goal of reducing overshoot or fluctuation of the output value.

2. The automatic control artificial intelligence device of claim 1, wherein:
   the one or more processors is further configured to acquire one or more parameters for enabling the output value to closely follow the first base line by providing a reward based on a gap between the first base line and the output value.

3. The automatic control artificial intelligence device of claim 1, wherein:
   the one or more processors is further configured to perform the reinforcement learning in order to follow the first line for a first time until the output value reaches the set value and to follow the second line for a second time after the output value has reached the set value.

4. The automatic control artificial intelligence device of claim 3, wherein the first time is proportional to the second time.

5. The automatic control artificial intelligence device of claim 1, wherein:
   the one or more base lines further include a second base line; and
   the one or more processors is further configured to perform the reinforcement learning to acquire the one or more parameters in order for the output value to follow the first base line and to avoid the second base line.

6. The automatic control artificial intelligence device of claim 5, wherein the one or more processors is further configured to:
   provide a reward based on the gap between the first base line and the output value; and
   provide a penalty based on a gap between the second base line and the output value.

7. The automatic control artificial intelligence device of claim 6, wherein a magnitude of the penalty is greater than a magnitude of the reward.

8. The automatic control artificial intelligence device of claim 5, wherein the one or more processors is further configured to discard one or more parameters used for the control function when the output value matches one point on the second base line.

9. The automatic control artificial intelligence device of claim 1, wherein the one or more processors is further configured to reset the first base line according to a change in an environment condition.

10. A method for updating a control function by an automatic control artificial intelligence device, the method comprising:
    acquiring an output value according to control of a control system;
    setting at least one of one or more base lines and a reward based on a gap between the one or more base lines and the output value according to a plurality of operation goals of the control system; and
    updating the control function for providing a control value to the control system by performing reinforcement learning based on the gap between the one or more base lines and the output value,
    wherein the base line includes a first line and a second line,
    the first line indicates change in the output value obtained when the control system performs maximum control according to the maximum control value of the control function, to provide the artificial intelligence device with a goal of rapidly reaching a set value, and the second line is a goal value of the output value when specific operation is performed, to provide the artificial intelligence device with a goal of reducing overshoot of the output value or fluctuation of the output value above or below the set value after reaching the set value, wherein the reward includes a first reward and a second reward different from the first reward, the first reward is set based on a first gap between the first line and the output value according to the goal that the output value rapidly reaches a set value, and the second reward is set based on a second gap between the second line and the output value according to the goal of reducing overshoot or fluctuation of the output value.

11. The method of claim 10, wherein:

the updating of the control function includes acquiring one or more parameters for enabling the output value to closely follow the first base line by giving a reward based on a gap between the first base line and the output value.

12. The method of claim 11, wherein:

the acquiring of the one or more parameters includes performing the reinforcement learning in order to follow the first line for a first time until the output value reaches the set value and to follow the second line for a second time after the output value has reached the set value.

13. The method of claim 12, wherein the first time is proportional to the second time.

14. The method of claim 11, wherein:

the one or more base lines further include a second base line; and the updating of the control function includes performing the reinforcement learning to acquire the one or more parameters in order for the output value to follow the first base line and to avoid the second base line.

15. The method of claim 14, wherein the performing of the reinforcement learning includes:

providing a reward based on the gap between the first base line and the output value; and providing a penalty based on a gap between the second base line and the output value.

16. The method of claim 15, wherein a magnitude of the penalty is greater than a magnitude of the reward.

17. The method of claim 14, wherein the performing of the reinforcement learning includes discarding one or more parameters used for the control function when the output value matches one point on the second base line.

18. The method of claim 11, further comprising resetting the first base line according to a change in an environment condition.

* * * * *